United States Patent Office 3,480,446
Patented Nov. 25, 1969

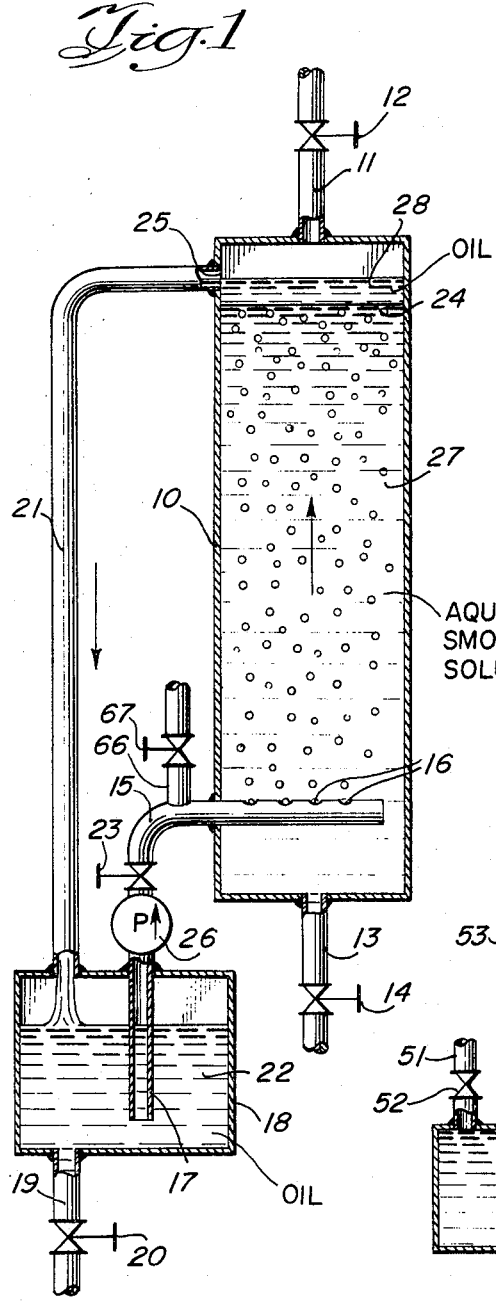
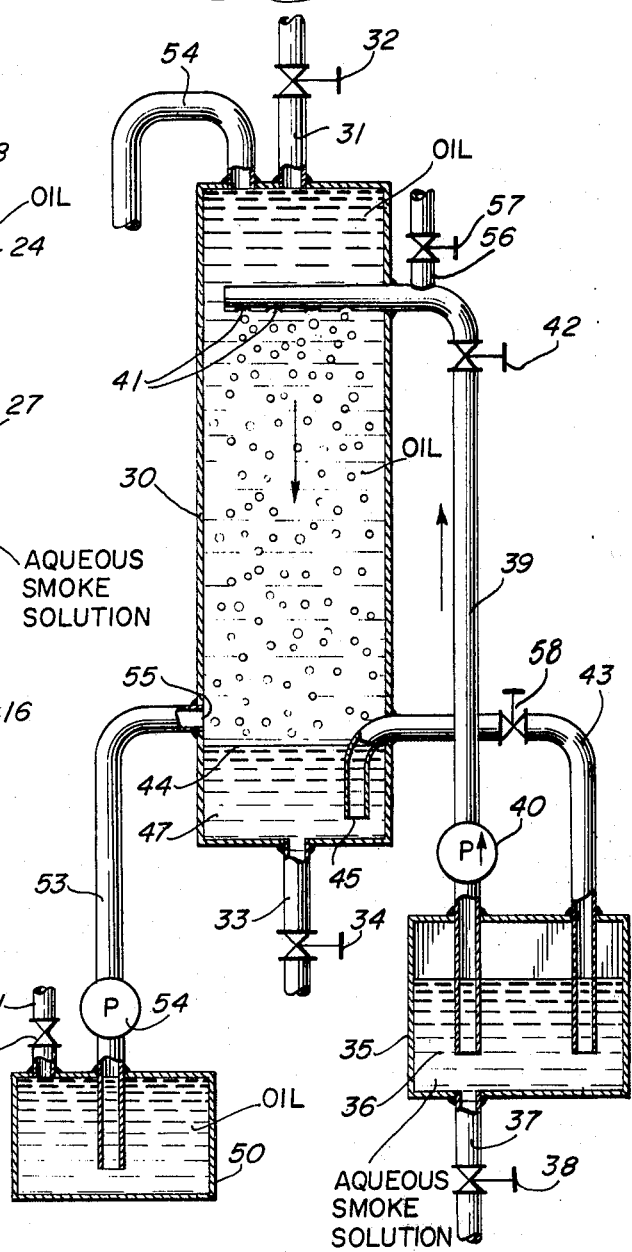

3,480,446
PREPARATION AND USE OF A SMOKE-
FLAVORED EDIBLE OIL
Clifford M. Hollenbeck, Manitowoc, Wis., assignor, by mesne assignments, to Red Arrow Products Corporation, Milwaukee, Wis., a corporation of Wisconsin
Filed Feb. 26, 1965, Ser. No. 435,438
Int. Cl. A23d 5/02; A23l 1/00
U.S. Cl. 99—118                                 9 Claims

ABSTRACT OF THE DISCLOSURE

Disclosed is a process of making a smoke-flavored edible oil by contacting the oil with an aqueous smoke-flavored solution.

This invention relates to food products. More particularly, this invention is concerned with novel smoke-flavored products and processes of preparing the same.

The smoking of foods for preservation and flavor has been done for a long time. In addition to the use of smoke houses for this purpose, liquid smokes of the pyroligneous acid type, which are aqueous distillates formed by heating wood, have also been used. More recently, aqueous smoke-flavored solutions have been provided, one of which is disclosed in Hollenbeck Patent No. 3,106,473. The aqueous smoke-flavored solutions are characterized by excellent flavor, aroma and taste which they impart to comestibles, in addition to being highly convenient to use for most foods, and of reproducible uniform quantity and purity.

It is not feasible in all instances, however, to use an aqueous solution to impart the desired smoke flavor because water is incompatible or undesirable in various foods, such as various products of the oily type. While edible oils can be smoked by directly contacting the oil with smoke, this procedure leads to dissolution in the edible oils of undesirable materials, including strong flavored tars and such deleterious hydrocarbons as benzpyrene and other carcinogens, which could only be removed with difficulty, if at all. There has accordingly been a need for smoke-flavored edible oils which possess the desirable smoky flavor and aroma but which lack the undesirable properties of directly smoked edible oils.

According to the present invention there is provided a novel process of producing a smoke-flavored edible oil. The process broadly comprises intimately contacting an edible oil in liquid form with an aqueous smoke-flavored solution, settling the mixture into a smoke-flavored edible oil phase and an aqueous phase and separating each phase from the other.

The aqueous smoke-flavored solution used as a starting material can be produced by the process disclosed in Hollenbeck Patent No. 3,106,473 or by any other method which gives a suitable aqueous solution of smoke flavors. Generally, the aqueous smoke-flavored solution should contain from about 5 to 15 mg. of phenol, expressed as dimethoxyphenol, per ml. of aqueous solution, for producing a smoke-flavored oil with a commercially practicable process.

The edible oils used in the process can be of vegetable or animal source, although in general they should be liquid at temperatures from about 15° C. to about 75° C. If higher temperatures are needed to liquefy the oils some of the flavor constituents in the aqueous smoke-flavored solution could be driven off or otherwise polymerized in the process. Some of the oils which can be used are corn oil, soybean oil, peanut oil, cottonseed oil, olive oil, sesame seed oil and lard oil.

In producing the smoke-flavored edible oil, the oil can be brought into contact with the aqueous smoke solution on a batch, or continuous, extraction basis. Probably the most straight-forward method is to bring together a suitable volume of oil and a suitable volume of aqueous smoke solution, mix the liquids together thoroughly, settle the mixture into an upper oil layer and a lower water layer, and then separate the oil layer from the water layer. In this way, the smoke flavors are extracted into the oil and give the oil the desired smoke-flavored aroma and flavor.

The oil can be brought into contact with additional aliquots of the aqueous smoke-flavored solution until the oil obtains the desired level of smoke flavor. In addition, when a highly smoke-flavored aqueous solution is used it can be extracted with one or more aliquots of edible oil with sufficient smoke flavors being removed from the water. Regardless of the aliquots of either oil or water that are extracted, it is generally most suitable to use 1 volume of edible oil to extract about 0.5 to about 5 volumes of aqueous smoke-flavored solution.

The oil should generally be contacted with the aqueous smoke-flavored solution until the phenol content of the oil is raised to at least 5 mg./ml. expressed as dimethoxyphenol in order to have an acceptable minimum smokiness. Advisably, the extraction should proceed until the phenol concentration of the oil reaches 9 mg./ml. to have a more suitable smokiness level.

The smoke-flavored edible oil can also be conveniently produced by intimately contacting the volume of edible oil in liquid form with an aqueous smoke-flavored solution by passing one of the liquids through the other by gravity flow until the edible oil becomes smoke-flavored. In practicing the process, an edible oil in liquid form can be fed into the lower portion of a column containing an aqueous smoke-flavored solution so that the edible oil is forced by gravity to flow upwardly through and in contact with the aqueous smoke-flavored solution and in doing so smoke-flavoring materials are extracted from the aqueous smoke-flavored solution into the oil. Alternatively, an aqueous smoke-flavored solution can be fed into the upper portion of a column containing an edible oil in liquid form so that the aqueous smoke-flavored solution flows by gravity downwardly through and in contact with the edible oil and in doing so the smoke-flavoring materials are extracted from the aqueous smoke-flavored solution into the oil. Inert column packing material or plates may be used in the column, if desired, to give more dispersion and intimate contact between the oil and aqueous phases. These processes will now be discussed further in conjunction with the attached drawings in which:

FIGURE 1 shows schematically apparatus whereby an edible oil is fed into the bottom of a column containing aqueous smoke-flavored solution so that by gravity flow the oil rises through the aqueous solution and in doing so extracts smoke flavors from the water; and FIGURE 2 shows schematically apparatus for feeding an aqueous smoke solution into the upper portion of a column containing an edible oil so that by gravity flow through the oil the smoke flavors are extracted from the aqueous solution into the oil.

As shown in FIG. 1, column 10, closed at both ends, has at its upper end an outlet pipe 11 with a valve 12 that can be used for filling the column. The bottom of the column has a pipe 13 controlled by valve 14 for emptying or filling the column. Thus, this valve and pipe arrangement can be used to feed an aqueous smoke solution into, or remove it from, the column. Communicating with the inside of the lower portion of column 10 is pipe 15 which has holes 16 on its end portion inside the column. Connected to pipe 15 is pipe 66 with valve 67 to be used for continuously adding fresh oil, if desired, while smoke-flavored oil product is being continuously withdrawn through pipe 19. For such operation valve 23 would be closed. The lower end 17 of pipe 15 feeds into a holding vessel 18 for the edible oil. The vessel 18 has a pipe 19 at the bottom controlled by valve 20 to empty and fill the vessel with oil. Pipe 21 communicates with the top of vessel 18 and the top inside area of column 10. In practicing the process of this invention on a batch basis, vessel 18 is filled to an appropriate level with an edible oil 22. Valve 23 in pipe 15 is closed and an aqueous smoke-flavored solution is fed into column 10 until it nearly fills the column. Upper level 24 of the aqueous solution should be well below the area 25 where pipe 21 joins column 10 so that the aqueous solution does not overflow into pipe 21. Valve 23 is opened and pump 26 turned on to convey oil from vessel 18 by pipe 15 into the lower portion of column 10. As the oil is forced through the openings 16 it flows upwardly in droplets since the oil is less dense than the aqueous smoke-flavored solution. The oil droplets, once they reach the top surface of the smoke-flavored solution 27, form a layer 28 on the top thereof. The oil layer 28 continues to increase in thickness until it flows through opening 25 and into pipe 21 and thus back into vessel 18. The oil is then recirculated by pump 26 into column 10 in order to continue the extraction of smoke-flavoring materials from the aqueous smoke-flavored solution in the column into the edible oil. Once the oil has acquired the desired smokiness the process can be terminated and the smoke-flavored edible oil removed from vessel 18 through pipe 19 with valve 20 open. The equipment can then be used again to produce another batch of smoke-flavored edible oil. If the smoke-flavoring content of the aqueous smoke-flavored solution 27 has been reduced appreciably, it should be replaced with a fresh solution before an additional quantity of edible oil is fed therethrough, or the same oil in vessel 18 can be circulated through the fresh aqueous smoke-flavored solution. The process can also be operated on a continuous basis by continually introducing fresh oil through pipe 66, removing smoke-flavored oil continuously through pipe 19, continuously adding fresh aqueous smoke solution through pipe 11 and continuously removing spent aqueous solution through pipe 13.

With reference to FIG. 2, column 30, closed at both ends, has pipe 31 at its upper end controlled by valve 32, and a pipe 33 at its lower end controlled by valve 34. Vessel 35 is provided to hold aqueous smoke-flavored solution 36. Vessel 35 can be emptied and filled by pipe 37 controlled by valve 38. By means of pipe 39 and pump 40 aqueous smoke solution can be delivered to the upper inner portion of column 30 and the aqueous solution fed into the column through holes 41. Valve 42 is provided to control flow in pipe 39. Communicating with vessel 35 is pipe 43 controlled by valve 58 which runs to the inner bottom portion of column 30. The pipe 43 permits aqueous solution in the lower portion of column 30 to be delivered through pipe 43 into vessel 35 from which it can be recirculated through pipe 39 to the upper portion of column 30. Vessel 50 is provided to hold edible oil which can be fed into it by pipe 51 controlled by valve 52. Pipe 53 is used to withdraw oil by pump 54 and convey it to the lower portion of column 30. Pipe 54 is provided at the upper part of column 30 to withdraw oil from the column.

In operating the apparatus of FIG. 2, aqueous smoke-flavored solution is supplied to the bottom portion of the column so that its level 44 is above the end 45 in pipe 43 but below the end 55 of pipe 53. The aqueous smoke solution can be so provided in the lower portion of column 30 by feeding it into the column through pipe 33 at the bottom or pipe 31 at the top. Once the strata of aqueous solution has been provided at the bottom of column 30, edible oil is fed therein by pipe 53 until it reaches the top of the column. Once the column is so prepared inside, the aqueous smoke solution 36 in vessel 35 can be delivered through pipe 39, with valve 42 open, to the openings 41 from which it will flow as small droplets. The droplets of aqueous solution being heavier and more dense than the edible oil will then settle by gravity through the column of edible oil and join the pool of smoke solution 47 at the bottom of column 30. As the aqueous solution accumulates at the bottom of the column it will flow through opening 45 into pipe 43 and back to the aqueous smoke solution 36 in vessel 35. The aqueous solution can then be repumped through pipeline 39 into column 30. This extraction procedure can continue until the smokiness of the edible oil has reached a desired concentration. In order to increase the smokiness of the edible oil, the solution 36 in vessel 35 can be drained and replaced by fresh aqueous smoke-flavored solution and it recirculated until the oil acquires a desired smoke-flavored concentration. Once the oil has attained the desired smoke concentration, it can be removed from the column 30 such as by first removing the lower water portion 47 and then the oil thereafter. Alternatively, the smoke-flavored oil can be withdrawn slowly through pipe 54 as unsmoked oil is supplied at the bottom of the column by pipe 53, while the aqueous smoke solution can be continuously added through pipe 56, with valve 57 open and valve 42 closed, and continuously withdrawn through pipes 37 and 43. In this way a continuous process can be easily operated.

It has been found that the inclusion of a small amount of sodium chloride, or any other soluble edible salt, in the aqueous smoke-flavored solution increases the density of the aqueous smoke solution and facilitates the extraction of the smoke flavors and phenolic materials into the edible oil. Generally, not more than 5% by weight of sodium chloride based on the weight of the aqueous smoke solution need be used although higher amounts have no adverse effect.

By producing smoke-flavored edible oils according to this invention only the better flavored components of the smoke are absorbed by the oil. The dark colored, strong flavored "tarry" materials of smoke are not present in the aqueous solution to dissolve in the oil as they are when oil is contacted directly with smoke. The undesirable carcinogenic hydrocarbons from smoke are easily eliminated from the water phase, as shown in Hollenbeck Patent No. 3,106,473, prior to contact with and dissolution in the oil from which they would be difficult to remove. The smoke-flavored oil is thus produce essentially free of benzpyrene and similar carcinogenic compounds.

The smoke-flavored oils provided hereby have many uses. They can be used as frying oils to impart smoke flavoring to foods. They can also be used to mask strong flavors in foods, such as "porkiness" and "beany" flavors. The smoke-flavored oils can also be used in oil packed canned foods like sardines as a substitute for smoking. The smoke-flavored oils as produced hereby can be added in any desired amount to unflavored oils to impart any degree of smokiness thereto. However, a 10% dilution of a smoke-flavored oil, as provided herewith, with unsmoked oil gives a good cooking oil for flavoring foods such as potatoes with smoke.

In addition, it has been found that the smoke-flavored edible oils have potent antioxidant properties and that when added in a small amount to oils, including fats, it prevents them from becoming rancid, due to oxidation, for extended periods of time. The smoke-flavored edible oil can be used in small amounts as an additive in edible oil in place of, or together with, recognized food-acceptable antioxidants such as butylated hydroxyanisole (BHA) and butylated hydroxytoluene (BHT). Thus, besides giving oily foods a desirable smoke flavor, the smoke-flavored oils retard oxidation and rancidity development.

EXAMPLE 1

Two 20 ml. portions of refined corn oil were used to extract the smoke flavor from 100 ml. of aqueous smoke-flavor solution prepared as in Hollenbeck Patent No.

3,106,473 by shaking the 20 ml. of oil with the 100 ml. of smoke solution, allowing the layers to separate, draining the aqueous layer, and repeating the extraction with the second 20 ml. portion of oil. The two oil extracts were then combined, the residual aqueous phase was allowed to settle from the oil and was then removed.

The results of analyses for phenols which serve as an index to smoke flavor potency in the combined oil extracts, at 20° C. and 60° C. temperatures of the oil and aqueous layers in the extractions, and with and without 5% by weight of sodium chloride added to the aqueous layer to facilitate the extraction, are shown in the following table:

| | Smoke-flavor level in each layer (based on phenol content mg./ml.) [1] | | | |
|---|---|---|---|---|
| | 20° C. | | 60° C. | |
| | Aqueous | Oil | Aqueous | Oil |
| Before two extractions | 14.4 | | | |
| After two extractions (with salt) | 8.3 | 23.0 | 8.5 | 11.3 |
| After two extractions (without salt) | 10.5 | 11.2 | 10.5 | 10.0 |

[1] The phenols were determined by a modification of the method of Tucker, J.A.O.A.C. 25 779 (1942), and are expressed as mg. per ml. of dimethoxy phenol.

EXAMPLE 2

Two and one-half gallons of aqueous smoke-flavor solution (U.S. Patent No. 3,106,473), with a phenolic content of 10.3 mg. per ml., were extracted with two portions of corn oil of one-half gallons each in the manner described in Example 1. The extractions were made at room temperature (about 23° C.), the two portions of oil were combined, warmed to about 60° C., which decreases the viscosity of the oil phase sufficiently to give good separation of the residual water phase, and the water phase separated. The smoke-flavored oil was filtered through coarse paper to clarify it. The smoke-flavor level, as measured by the phenolic level, in this oil was 9.5 mg. per ml.

EXAMPLE 3

A fifty ml. portion of refined corn oil was shaken in a separatory funnel with two successive 50 ml. portions of an aqueous smoke solution which was different in character from the aqueous smoke solution used in the previous examples since this aqueous smoke solution was prepared by condensation of the wood smoke in a water cooled condenser rather than absorption of the wood smoke flavors directly into water. The aqueous smoke solution contained 6.5 mg. phenols per ml. The analyses on the oil after the first and after the second extractions are shown in the following table:

| Extraction: | Phenols in the oil phase, (mg./ml.) |
|---|---|
| 1 | 2.6 |
| 2 | 6.2 |

The flavor characteristics of the smoke-flavored oil in this example were different than the oil from the previous examples, but were acceptable. The smoke-flavored oil was also useful as a flavoring agent for food oils.

EXAMPLE 4

Twenty-four gallons of refined corn oil were placed in a 55 gallon aluminum drum, which was to be used as a mixing vessel. This drum was fitted with a valve on its bottom through which the water phase could be drawn off. Twenty-four gallons of an aqueous smoke-flavor solution (containing 12.0 mg./ml. of phenols) were pumped into the drum and the two materials mixed with a lightning mixer for one hour. One hour was allowed for the aqueous phase to separate from the oil phase and then it was drawn off through the bottom of the drum. Another 24 gallons of aqueous smoke solution were pumped into the drum and again mixed with the oil for one hour. After the aqueous phase was settled out, a sample of the oil was analyzed for phenols and was found to contain 7.19 mg./ml. phenol. An additional extraction of the aqueous smoke solution was performed to bring the phenol level to about 9.00 mg./ml., which was the level desired for a particularly good smoke-flavored oil. The final analyses of the oil phase after three transfers from the water solution showed that it had 9.33 mg./ml. of phenolic content.

EXAMPLE 5

A small amount (800 ml.) of smoke-flavored cottonseed oil was made in the laboratory. A 1000 ml. separatory funnel was used for mixing the oil with the aqueous smoke solution. Two extractions with aqueous smoke solution in equal proportions to the oil were used, followed by a twenty-four hour separation time. Analyses after separation showed the cottonseed oil contained 9.16 mg./ml. phenol.

EXAMPLE 6

Two pounds of commercial lard were warmed to 45° C. in a water bath prior to its mixing with an aqueous smoke solution. An equal amount of aqueous smoke solution was warmed to 45° C. and then mixed with melted lard for one-half hour. After the lard and aqueous layer separated, another 908 ml. of aqueous smoke solution were mixed with the lard and finally all of the water phase was separated from the lard in a separatory funnel. After two extractions at 45° C., the lard contained 7.77 mg./ml. phenol.

EXAMPLE 7

Smoke-flavored corn oil was prepared by continuously introducing corn oil drop-wise into the bottom of a 12 foot column (2 inches in diameter) filled with aqueous smoke-flavor solution. The drops of oil moved upward through the column due to the oil being less dense than the aqueous phase. The oil layer at the top surface of the column was removed by continuous siphoning at the same rate as the oil was added to the bottom of the column. The extraction-separation process was continued, with recycling of the smoke-flavored oil, until the oil attained a good smoky flavor. In this particular experiment the phenolic level reached 7.2 mg./ml.

EXAMPLE 8

A sample of corn oil was flavored with the smoke-flavored corn oil from Example 2 by adding 10% by volume of the smoke-flavored corn oil. The smoke-flavored corn oil was then used for the preparation of potato chips by heating the oil to about 200° C., dropping raw potato chips into the hot oil, and frying them until they attained the appearance and color of the usual commercial potato chips. A comparable lot of the chips was fried in corn oil without the smoke-flavored oil added.

The potato chips with the smoke-flavored oil added in the frying oil had a pleasant smokiness in flavor, compared to the controls.

Similarly, raw, shelled peanuts were fried in corn oil flavored with 10% of the smoke-flavored corn oil of Example 2. The fried peanuts acquired a pleasant "smokiness" in flavor, compared to controls fried in unflavored corn oil.

EXAMPLE 9

To two 50 ml. portions of rendered pork fat, 1.0 and 0.5 ml., respectively, of smoke-flavored corn oil of Example 2 were added. These mixtures, as well as portions of the same fat with BHT (0.1%) added, BHA (0.1%) added, and a control without an additive were stored at 40° C. with periodic measurements for TBA equivalents[1].

[1] BHT (butylated hydroxytoluene), BHA (butylated hydroxyanisole). A method of measuring rancidity development with the use of 2-thiobarbituric acid, Turner, et al., Food Tech. 8 326 (1954).

The results in the following table illustrate the antioxidant effectiveness of the smoke-flavored oil

| Storage time in days | 0 | 5 | 7 | 14 | 35 |
|---|---|---|---|---|---|
| Antioxidant: | | | | | |
| None | 0.05 | 0.15 | 0.26 | 0.54 | 0.52 |
| 0.1% BHT | | 0.03 | 0.04 | 0.06 | 0.08 |
| 0.1% BHA | | 0.03 | 0.03 | 0.02 | 0.04 |
| 0.5 ml. smoke-flavored oil | | 0.02 | 0.03 | | 0.03 |
| 1.0 ml. smoke-flavored oil | | 0 | 0.05 | 0.05 | 0.06 |

The samples with the antioxidants, and those with the smoke-flavored oil, were still not rancid after 5 weeks, while the control was very rancid after 1 week.

The foregoing detailed description has been given for clearness of understanding only, and no unnecessary limitations should be understood therefrom, as modifications will be obvious to those skilled in the art.

What is claimed is:

1. The process of preparing a smoke-flavored edible oil which comprises intimately contacting an edible oil in liquid form with an aqueous smoke-flavored solution essentially lacking in tarry materials and carcinogenic hydrocarbons at a temperature up to about 75° C. until the phenol concentration, expressed as dimethoxyphenol, of the edible oil is raised to at least 2.6 mg./ml., settling the mixture into a smoke-flavored edible oil phase and an aqueous phase and separating each phase from the other.

2. The process of claim 1 in which 1 volume of edible oil is contacted with about 0.5 to 5 volumes of aqueous smoke-flavored solution.

3. The process of claim 1 in which the edible oil and aqueous smoke-flavored solution are at a temperature from about 15° C. to 75° C., and liquid, during contact with one another.

4. The process of claim 1 in which a small amount of sodium chloride is present in the aqueous smoke-flavored solution during contact with the edible oil.

5. The process of preparing a smoke-flavored edible oil which comprises intimately contacting an edible oil in liquid form with an aqueous smoke-flavored solution essentially lacking in tarry materials and carcinogenic hydrocarbons but containing a phenol concentration of about 5 to 15 mg./ml. expressed as dimethoxyphenol and continuing said contact until the phenol at a temperature up to about 75° C. concentration of the edible oil is raised to at least 5 mg./ml., settling the mixture into a smoke-flavored edible oil phase and an aqueous phase and separating each phase from the other.

6. The process of preparing a smoke-flavored edible oil which comprises feeding an edible oil in liquid form into the lower portion of a column containing an aqueous smoke-flavored solution essentially lacking in tarry materials and carcinogenic hydrocarbons at a temperature up to about 75° C. so that the edible oil is forced by gravity to flow upwardly through and in contact with the aqueous smoke-flavored solution and in doing so smoke flavoring materials are extracted from the aqueous smoke-flavored solution into the edible oil until the phenol concentration, expressed as dimethoxyphenol, is raised to at least 2.6 mg./ml., and separating the smoke-flavored oil so produced from the aqueous solution.

7. The process of claim 6 in which the oil collecting at the top of the aqueous solution is recirculated to the lower portion of the aqueous solution until the oil obtains a phenol concentration of at least 5 mg./ml., expressed as dimethoxyphenol.

8. The process of preparing a smoke-flavored edible oil which comprises feeding an aqueous smoke-flavored solution essentially lacking in tarry materials and carcinogenic hydrocarbons at a temperature up to about 75° C. into the upper portion of a column containing an edible oil in liquid form so that the aqueous smoke-flavored solution flows by gravity downwardly through and in contact with the edible oil and in doing so smoke-flavoring materials are extracted from the aqueous smoke-flavored solution into the edible oil until the phenol concentration, expressed as dimethoxyphenol, is raised to at least 2.6 mg./ml., and separating the smoke-flavored oil so produced from the aqueous solution.

9. The process of claim 8 in which the water collected at the bottom of the oil is recirculated to the upper portion of the oil column until the oil obtains a phenol concentration of at least 5 mg./ml. expressed as dimethoxyphenol.

References Cited
UNITED STATES PATENTS

| | | | |
|---|---|---|---|
| 2,346,232 | 4/1944 | Piret et al. | 99—208 |
| 3,106,473 | 10/1963 | Hollenbeck | 99—140 X |
| 3,152,914 | 10/1964 | Taylor | 99—140 |

FOREIGN PATENTS

| | | |
|---|---|---|
| 139,907 | 1/1951 | Australia. |

MAURICE W. GREENSTEIN, Primary Examiner

U.S. Cl. X.R.

99—1, 140, 229

PO-1050
(5/69)

UNITED STATES PATENT OFFICE
CERTIFICATE OF CORRECTION

Patent No. 3,480,446            Dated    November 25, 1969

Inventor(s)   Clifford M. Hollenbeck

It is certified that error appears in the above-identified patent and that said Letters Patent are hereby corrected as shown below:

Column 4, line 46, "produce" should be -- produced --.
Column 7, line 45, after "dimethoxyphenol" insert -- at a temperature up to about 75°C. --; lines 46 and 47, delete "at a temperature up to about 75°C.". Column 8, line 32, "collected" should be -- collecting --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents